US007694400B2

(12) United States Patent
Schlueter et al.

(10) Patent No.: US 7,694,400 B2
(45) Date of Patent: Apr. 13, 2010

(54) THREADED INSERT INSTALLATION TOOL

(75) Inventors: Arthur W. Schlueter, St. Charles, MO (US); Michael A. Poe, Brighton, IL (US); Timothy L. Saffle, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 1373 days.

(21) Appl. No.: 11/126,707

(22) Filed: May 10, 2005

(65) Prior Publication Data

US 2006/0265857 A1 Nov. 30, 2006

(51) Int. Cl.
*B23P 11/00* (2006.01)

(52) U.S. Cl. ......................... 29/258; 29/525.11; 29/270

(58) Field of Classification Search .................. 29/258, 29/270, 278, 272, 240.5; 81/459
See application file for complete search history.

(56) References Cited

U.S. PATENT DOCUMENTS 4,351,179 A * 9/1982 Fiebiger ................ 29/243.521
4,976,173 A * 12/1990 Yang ............................. 81/54
6,000,114 A * 12/1999 Newton et al. ............. 29/240.5
6,237,451 B1 * 5/2001 Wei ............................. 81/490
7,024,966 B2 * 4/2006 Chao ......................... 81/57.26
2002/0066172 A1 * 6/2002 Newton et al. ................ 29/456
2002/0096023 A1 * 7/2002 Sanford ..................... 81/124.2
2006/0265857 A1 * 11/2006 Schlueter et al. ......... 29/525.11
2007/0245533 A1 * 10/2007 Szewc et al. ............... 29/240.5

* cited by examiner

*Primary Examiner*—Lee D Wilson
(74) *Attorney, Agent, or Firm*—Yee & Associates, P.C.; James M. Poole

(57) ABSTRACT

A threaded insert installation tool includes an adapter assembly that connects a front and assembly with a driver. The threaded insert installation tool may be used in areas with limited access and may be operated with a battery-powered screwdriver. The adapter assembly may include a drive shaft that may have a segment square cross-section that may slide in linear direction within a square-hole sleeve assisted by a spring converting the rotary motion provided by the cordless screwdriver into a linear feed. The threaded insert installation tool may be suitable for, but not limited too, applications in the automotive, communication, aerospace, military and defense industries. The threaded insert installation tool may be used to install threaded inserts in tapped holes that are positioned in a space having an extended depth and a close proximity to surrounding walls, such as inside a cylinder or a barrel, for example, a missile shell.

20 Claims, 7 Drawing Sheets

THREADED INSERT INSTALLATION TOOL

BACKGROUND OF THE INVENTION

The present invention generally relates to threaded insert insertion tools and, more particularly, to a threaded insert installation tool for areas with limited access and to a method for installing threaded inserts in areas with limited access.

Threaded inserts, such as Heli-Coil® inserts (Heli-Coil® is a registered trademark of Emhart® Teknologies), provide positive means for protecting and strengthening all tapped threads. Threaded inserts are typically precision-formed screw thread coils of stainless steel wire having a diamond shaped cross-section. When the treaded inserts are installed into tapped holes, the threaded inserts provide permanent 60-degree internal screw threads that accommodate any standard bolt or screw. The threaded insert is typically larger in diameter than the tapped hole. During installation of the threaded insert with an installation tool, the installation tool applies torque to the insert reducing the diameter of the leading coil allowing the leading coil to enter the tapped hole. After installation, the threaded insert expands outwards with a spring force that permanently anchors the insert in place. When installed, a threaded insert provides a precision female thread of high surface finish and strength. Threaded inserts may increase the thread life of a tapped hole, especially in materials having a low hardness, such as aluminum, by eliminating the erosion of the thread due to friction. Furthermore, threaded inserts may make a tapped hole stronger by distributing the load applied to the threads by an inserted fastener evenly to each coil. Threaded inserts are typically available in two designs, the standard insert, which has a free-running thread, and the screw-lock insert, which provides a locking torque on the mating fastener using chord on one or more coils of the insert. Threaded inserts were invented in the late 1930's to provide a solution for the repair of aircraft engines. Currently, threaded inserts are used in automotive, communication, aerospace, military and defense industries. Presently, in many applications, for example in the aircraft industry, threaded inserts are part of the original design to prevent the need to repair threads of a tapped hole. Furthermore, the use of threaded inserts yields a much stronger assembly than a tapped hole of the parent material, for example, aluminum, could provide.

Installation of threaded inserts may be achieved with a driving tang, which is removed after assembly. To permit the removal of the tang, a notch is cut into the section of a threaded insert to provide a shear point. The driving tang is engaged in an abutment or slot of an insertion tool and prewound into a nozzle. After placing the insertion tool over the correctly tapped hole, further winding will install the threaded insert to the correct depth. After withdrawal of the insertion tool, the tang needs to be removed to allow a fastener, such as a bolt or screw, to pass through the insert. Threaded inserts may be installed into a tapped hole using an appropriate hand or power insertion tool. Hand tools are typically designed with a threaded mandrel and a driving contour that allows the correct and efficient installation of the threaded insert. Hand tools may be operated with an offset handle. Power tools typically consist of the same front-end assembly as manual operated insertion tools, which include a prewinder, a mandrel and spacers, an adapter, and a reversible motor. Existing hand and power insertion tools for threaded inserts may not be operable in tight spaces or spaces with limited access. For some applications, for example, for insertion of threaded inserts in a space having an extended depth and a close proximity to surrounding walls, such as inside a cylinder or a barrel, prior art insertion tools may be impractical. It may be necessary to remove the offset handle from a prior art manually operated insertion tool and to use an additional tool, such as a wrench, to operate the front-end assembly of the insertion tool.

Prior art threaded insert insertion tools include, for example, U.S. Pat. No. 6,000,114 issued to Newton et al. The insertion tool disclosed by Newton et al. may be used for insertion of a tang-free threaded coil insert into a threaded opening. The prior art insertion tool includes a blade, which is formed with a drive hook. Although the prior art insertion tool enables the insertion of a threaded coil insert fully within a threaded opening of a support structure such that the trailing end of the insert is flush with the external surface of the support structure adjacent to the opening, the insertion tool may not be suitable for insertion of threaded inserts in tight spaces and in close proximity to walls of a cylindrical structure.

As can be seen, there is a need for an installation tool for a threaded insert that may be used in tight spaces and spaces with limited access. Furthermore, there is a need for an installation tool that enables the insertion of a threaded insert into a tapped hole inside a barrel that extends for a length and that has a relatively small diameter.

There has, therefore, arisen a need to provide an installation tool for threaded inserts that may be used in areas with limited access. There has further arisen a need to provide an installation tool that may be power operated in areas with limited access. There has still further arisen a need for a method to install threaded fasteners in tight spaces where the tapped hole may be positioned in close proximity to a wall and at an extended depth.

SUMMARY OF THE INVENTION

The present invention provides a threaded insert installation tool that may be used in areas with limited access. The present invention provides a threaded installation tool that may be driven by a cordless screwdriver. The present invention provides a threaded installation tool that has an extended reach, and that can be operated within close wall clearance of a structure. The present invention provides a threaded insert installation tool that is suitable for, but not limited too, applications in the aircraft industry, both commercial and military, as well as in the defense industry as a whole.

In one aspect of the present invention, a threaded insert installation tool comprises an adapter assembly, and a front-end assembly. The adapter assembly includes a drive shaft that extends in longitudinal direction along an axis. The front-end assembly includes a mandrel that extends in longitudinal direction along the axis and that is in a rigid connection with the drive shaft.

In another aspect of the present invention, a threaded insert installation tool comprises a clamping ring, a bracket, a housing extending longitudinally along an axis from a back end to a front end, a drive shaft, and an internal assembly. The bracket is in a fixed connection with the clamping ring. The back end of the housing is connected with the bracket opposite from the clamping ring. The drive shaft extends longitudinally along the axis from a back end to a front end. The drive shaft is positioned within the housing. The drive shaft extends the housing into the clamping ring. The internal assembly is covered by the housing.

In a further aspect of the present invention, a method for installation of a threaded insert in an area with limited access comprises the steps of: connecting a front-end assembly with a driver using an adapter assembly to assemble a threaded insert installation tool; applying torque with the driver to the adapter assembly and the front-end assembly to pre-wind the threaded insert; placing the threaded insert installation tool over tapped hole; and applying torque to the adapter assembly and the front-end assembly with the driver to install the threaded insert. The tapped hole is positioned within a barrel at an extended length and in close proximity to a wall of the barrel.

These and other features, aspects and advantages of the present invention will become better understood with reference to the following drawings, description and claims.

Figure 5:
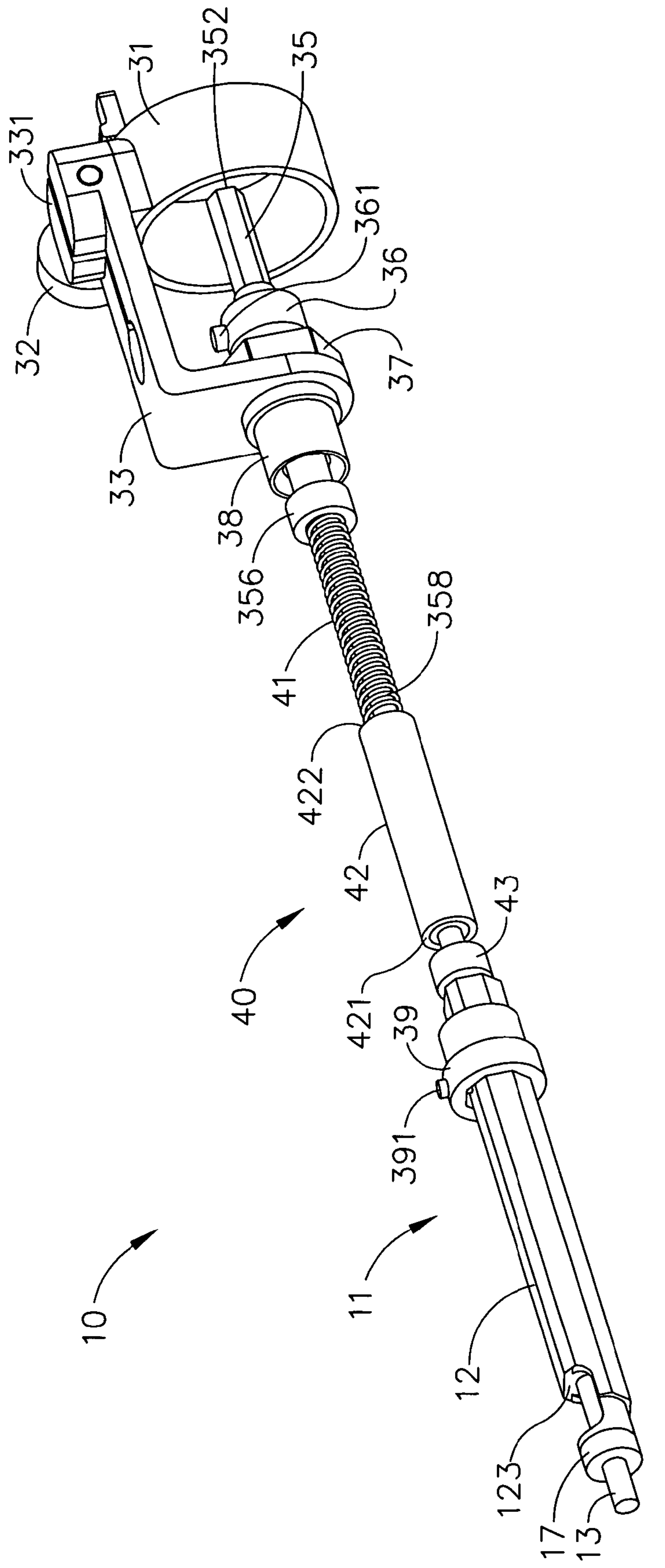
Figure 6:
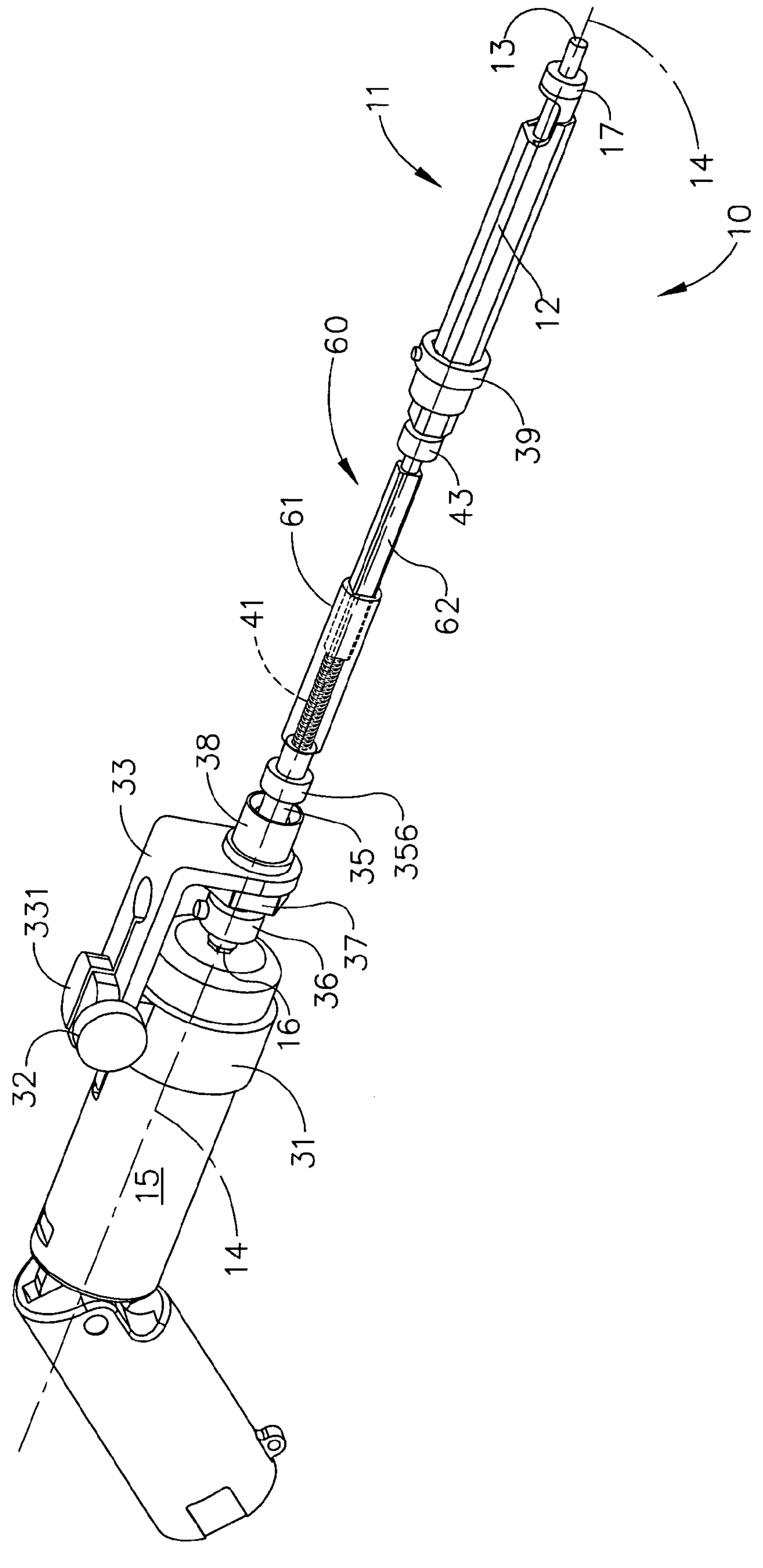
Figure 7:
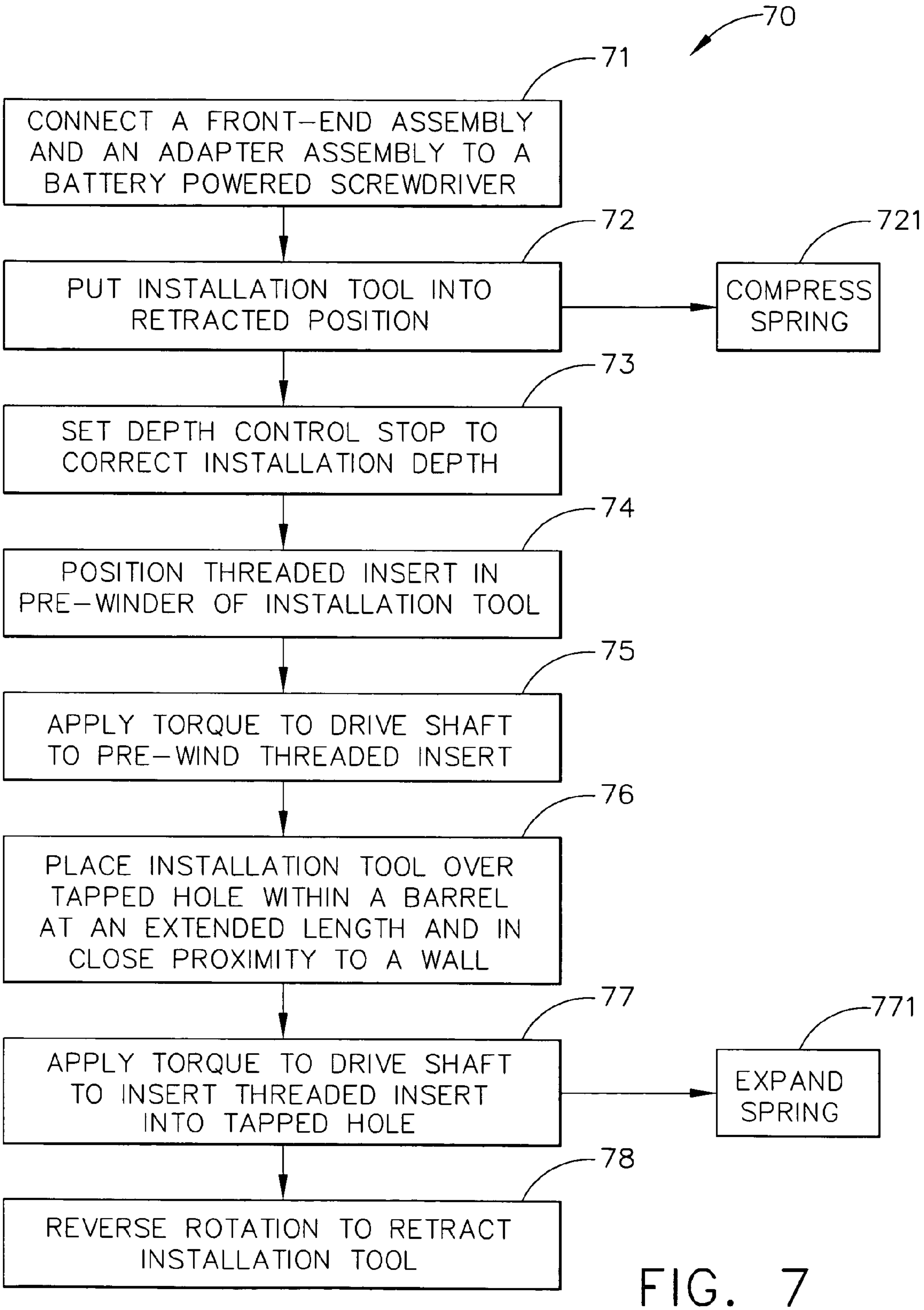

FIG. **4*a*** is a side view of a drive shaft according to one embodiment of the present invention;

FIG. 5 is a perspective view of an internal assembly of a threaded insert installation tool in a second operation mode according to one embodiment of the present invention;

FIG. 6 is a perspective view of an internal assembly of a third modification of a threaded insert installation tool according to one embodiment of the present invention; and FIG. 7 is a flow chart of a method for installation of a threaded insert in an area with limited access according to another embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a threaded insert installation tool that may be used in areas with limited access and that is operated with a battery-powered screwdriver. An embodiment of the present invention provides a threaded insert installation tool that is suitable for, but not limited too, applications in the automotive, communication, aerospace, military and defense industries. The threaded insert installation tool as in one embodiment of the present invention may be used to install threaded inserts in tapped holes that are positioned in a space having an extended depth and a close proximity to surrounding walls, such as inside a cylinder or a barrel. The threaded insert installation tool as in one embodiment of the present invention may be used to install threaded inserts, for example, inside a missile shell.

In one embodiment, the present invention provides a threaded insert installation tool that may include an adapter assembly that connects a front-end assembly with a cordless screwdriver. By attaching the adapter assembly to the front-end assembly, an extended reach may be provided for the threaded insert installation tool as in one embodiment of the present invention compared to prior art insertion tools. Furthermore, by using the adapter assembly as in one embodiment of the present invention, a close wall clearance of the threaded insert application tool can be realized. A close wall clearance at an extended depth may not be realized with a prior art manual insertion tool for installation of threaded inserts since the prior art manual insertion tool typically includes an offset handle that is used to operate the prior art insertion tool. By attaching the cordless, battery-powered screwdriver to the end of the adapter assembly opposite from the front-end assembly, the operation of the threaded insert installation tool as in one embodiment of the present invention may be automated contrary to the manual operation of prior art insertion tools. Consequently, threaded inserts may be installed more rapidly using the battery-operated threaded insert installation tool as in one embodiment of the present invention compared to using a prior art manual operated insertion tool. Furthermore, the threaded insert installation tool as in one embodiment of the present invention has a more ergonomic design than prior art manual operated insertion tools. Still further, operating the threaded insert installation tool as in one embodiment of the present invention may be less tedious and less exhausting than operating a prior art manual insertion tool where the offset handle had to be removed due to space restrictions, and that needed to be driven with another tool, for example, a wrench.

In one embodiment, the present invention provides a sliding drive feature that may include a drive shaft that may have a square cross-section that may slide in linear direction within a square-hole sleeve converting the rotary motion provided by the cordless screwdriver into a linear feed, which is not possible using prior art insertion tools, where the mandrel is in a rigid connection with the offset handle. By providing the sliding drive feature of the threaded insert installation tool as in one embodiment of the present invention, it may be possible to match the pitch (threads per inch) of the threaded insert, which is not possible using a prior art insertion tool, where the mandrel is in a rigid connection with the drive.

Figure 1:
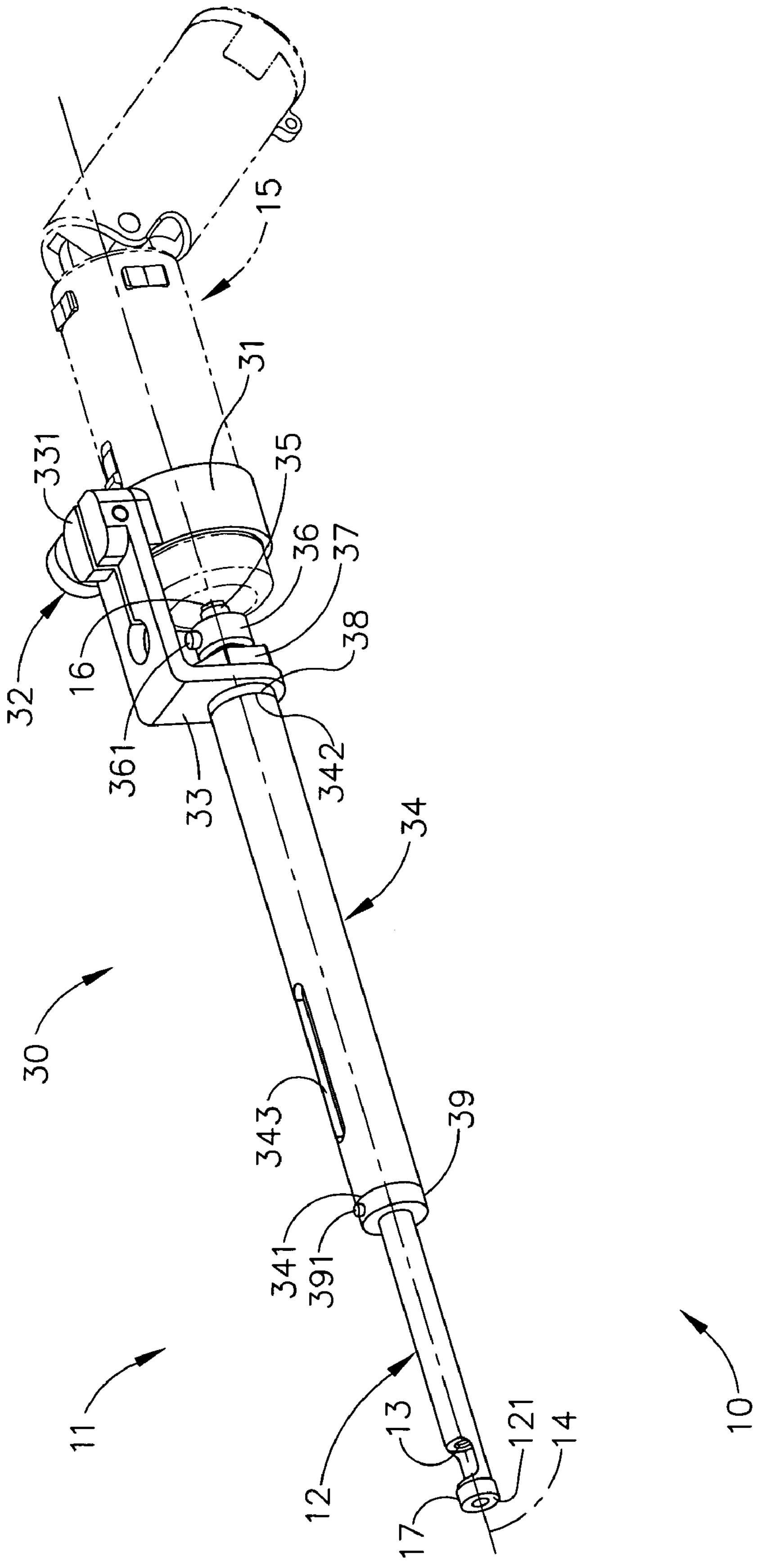
FIG. 1 is a perspective view of a first modification of a threaded insert installation tool according to one embodiment of the present invention.
Figure 2:
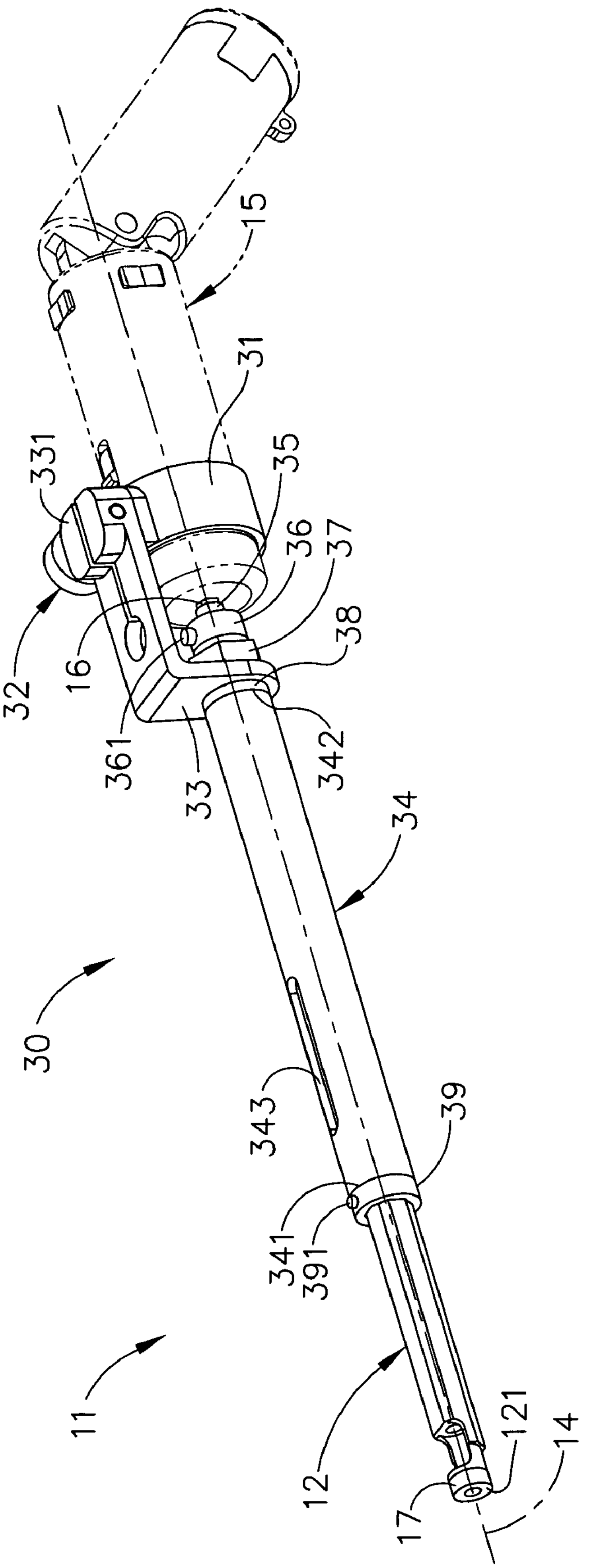
FIG. 2 is a perspective view of a second modification of a threaded insert installation tool according to one embodiment of the present invention.

Referring now to FIGS. 1 and 2, a first modification and a second modification of a threaded insert installation tool 10 are illustrated, respectively, according to one embodiment of the present invention. The threaded insert installation tool 10 may include an adapter assembly 30 (shown in detail in FIG. 3), a front-end assembly 11, and a driver 15. The adapter assembly 30 may connect the front-end assembly 11 with the driver 15. The front-end assembly 11 may include a prewinder 12 and a mandrel 13. The prewinder 12 may have, but is not limited to, the shape of a round barrel (as shown in FIG. 1) or may have the shape of an octagonal barrel (as shown in FIG. 2). The prewinder 12 may be a tube that extends longitudinally along an axis 14 from a front end 121 to a back end 122. The prewinder 12 may include a cutout 123 proximate to the front end 121 for receiving a threaded insert (not shown). The back end 122 of the prewinder 12 may be in a rigid connection with the adapter assembly 30. The mandrel 13 may be a shaft that extends longitudinally along the axis 14 from a front end 131 to a back end (not shown) and may be positioned within the prewinder such that the mandrel 13 may be rotated while the prewinder 12 is held stationary. The mandrel 13 may be threaded at both ends. The mandrel 13 may be in a rigid connection with a drive shaft 35 of the adapter assembly 30 (shown in FIGS. 4 and 5). The front-end assembly 11 may be, for example, a front-end assembly of a commercially available Heli-Coil® insertion tool, developed by Emhart® Teknologies, U.S.A. The driver 15 may include a bit socket 16 (shown in FIGS. 1 and 2) in which the drive shaft 35 (shown in FIGS. 1, 2, and 3) may be inserted. The driver 15 may be in a rigid connection with the adapter assembly 30. The driver 15 may be a commercially available, battery-operated, cordless screwdriver as illustrated in FIGS. 1 and 2. The driver 15 may be a battery-powered screwdriver of the series 6500 manufactured by Milwaukee, Wis. U.S.A. Any type of power driver or manual driver may be used as driver 15.

Figure 3:
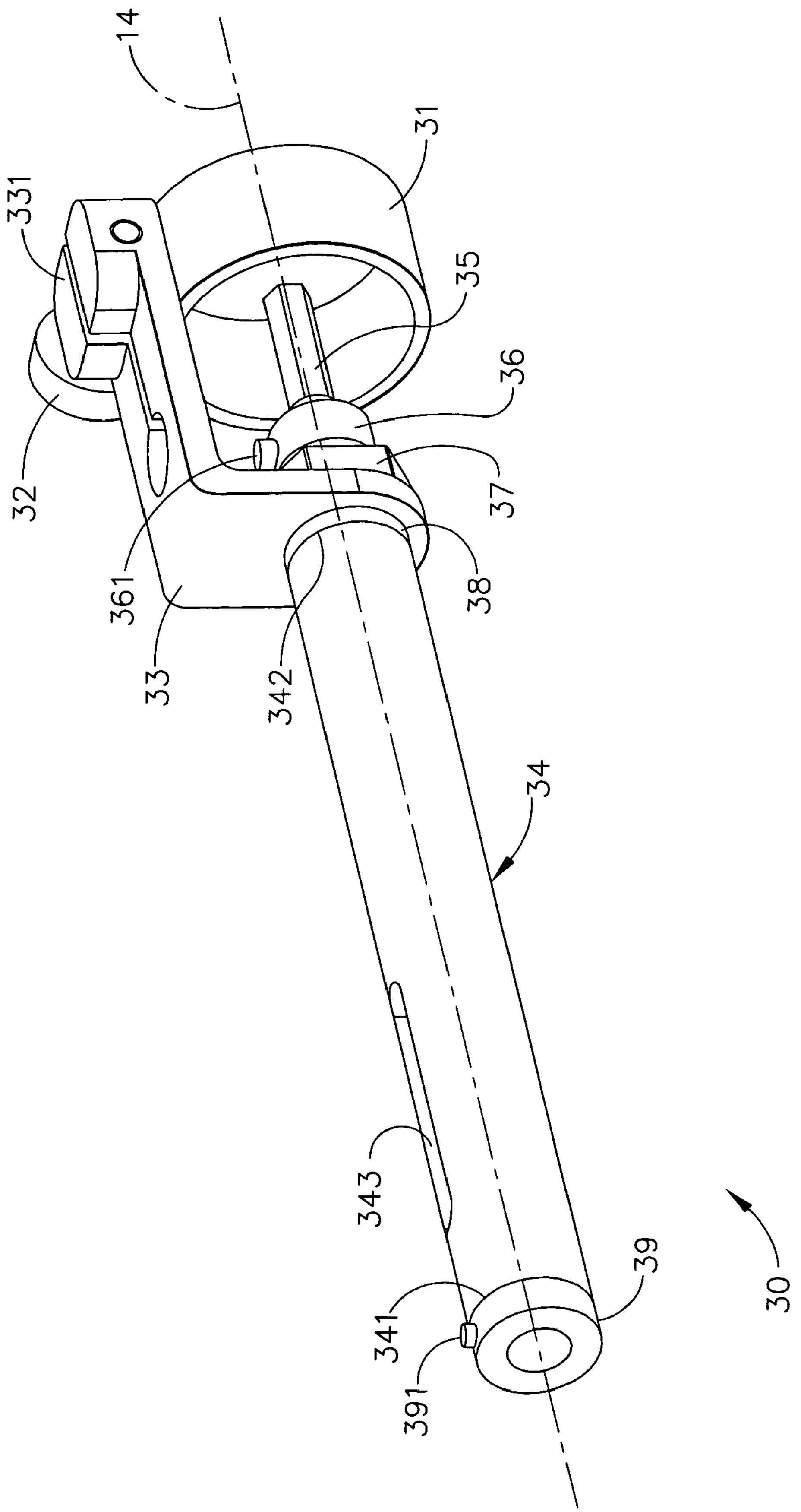
FIG. 3 is a side view of an adapter assembly according to one embodiment of the present invention.

Referring now to FIG. 3, an adapter assembly 30 is illustrated according to one embodiment of the present invention. The adapter assembly 30 may include a clamping ring 31, a clamping screw 32, a bracket 33, a housing 34, a drive shaft 35, a shaft collar 36, a jam nut 37, a first housing collar 37, and a second housing collar 39. The clamping ring 31 may be in a fixed connection with the L-shaped bracket 33. The clamping ring 31 may be, for example, welded to the bracket 33. The bracket 33 and the clamping ring 31 may have a split top 331. The clamping screw 32 may be inserted into the bracket 33 above the clamping ring 31 such that the split top 331 and, consequently, the clamping ring 31 may be tightened or loosened by turning the clamping screw 32. The clamping screw 32 may be, for example, a knurled head screw. The clamping ring 31 may be attached to the battery-powered screwdriver 15 as illustrated in FIGS. 1 and 2. The first housing collar 38 may be in a fixed connection with the bracket 33. The first housing collar 38 may have the shape of a tube extending longitudinally along axis 14 that may be threaded at both ends. The first housing collar 38 may be attached to the bracket 33 by inserting the collar 18 into an opening in the bracket 33 and by securing the collar 38 to the bracket 33 with the jam nut 37. The jam nut 37 may be, for example, a hexagonal jam nut. The first housing collar 38 may receive the housing 34. The housing 34 may have the shape of a tube that extends longitudinally along the axis 14 from a front end 341 to a back end 342 and that may be threaded at the inside at the front end 341 and at the back end 342. The back end 342 of the housing 34 may be screwed onto the first housing collar 38 opposite from the bracket 33. The housing 34 may cover an internal assembly 40 (illustrated in FIGS. 4 and 5). The housing 34 may include a cutout 343 positioned proximate to the front end 341. Certain elements of the internal assembly may be visible through the cutout 343, as described with FIG. 4. The second housing collar 39 may be attached to the front end 341 of the housing 34, for example, by screwing on. The second housing collar 39 may be secured using a set screw 391 to the prewinder 12 of the front end assembly 11 that extends the housing 34 longitudinally along axis 14, as illustrated in FIGS. 1 and 2. The drive shaft 35 may extend the housing 34 at the back end 342 along axis 14. The position of the drive shaft 35 relative to the bracket 33 may be secured using the shaft collar 36. The shaft collar 36 may be attached to the drive shaft 35 using a set screw 361. The drive shaft 35 may extend longitudinally along axis 14 from a front end 351 (shown in FIGS. 4 and 5) to a back end 352. The back end 352 may extend into the clamping ring 31. The back end 352 of the drive shaft 35 may have a hexagonal cross-section 353. The back end 352 of the drive shaft 35 may be inserted into the bit socket 16 of the battery-operated screwdriver 15, as illustrated in FIGS. 1 and 2.

Figure 4:
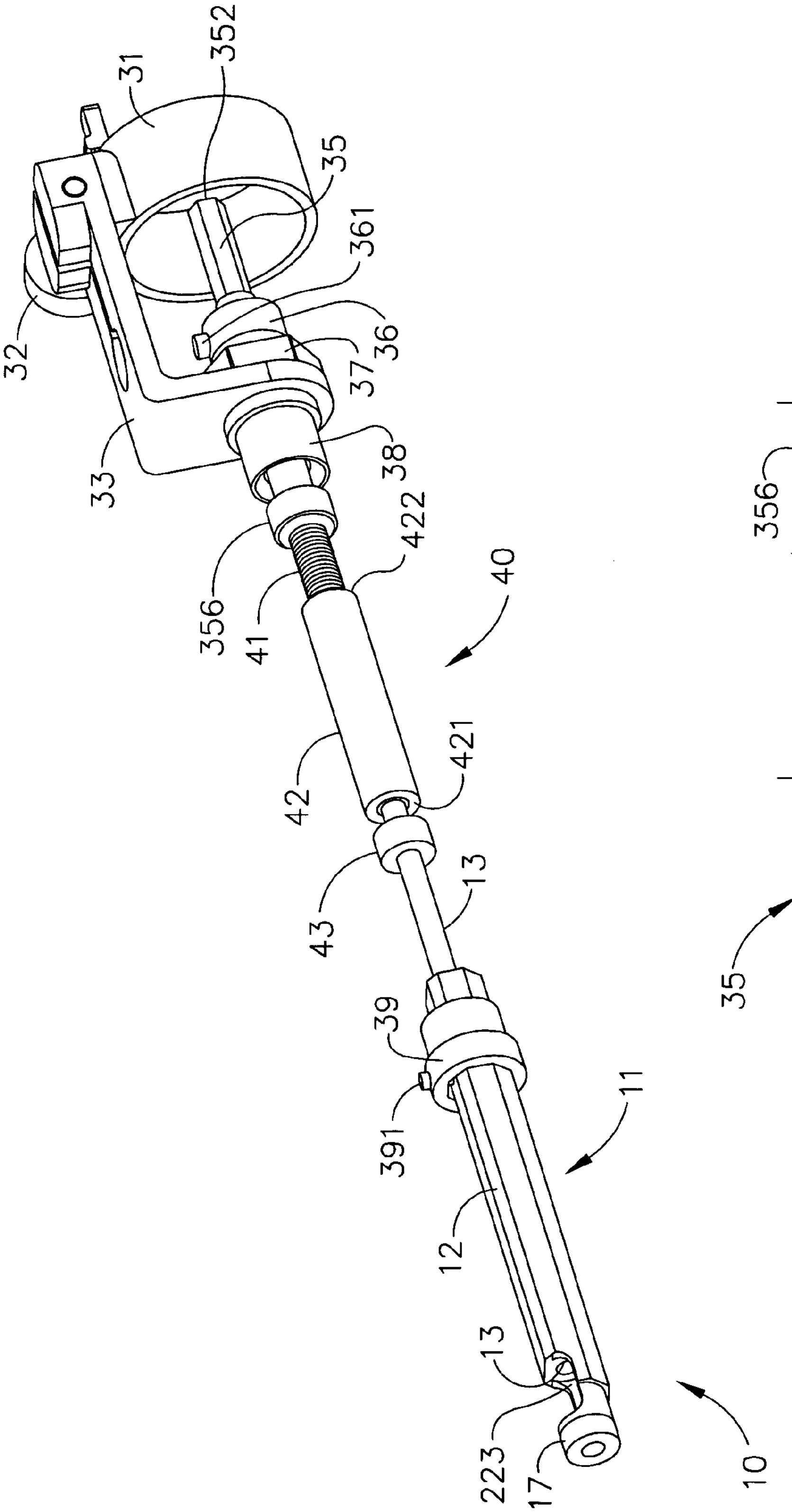
FIG. 4 is a perspective view of an internal assembly of a threaded insert installation tool in a first operation mode according to one embodiment of the present invention.
Figure 4A:
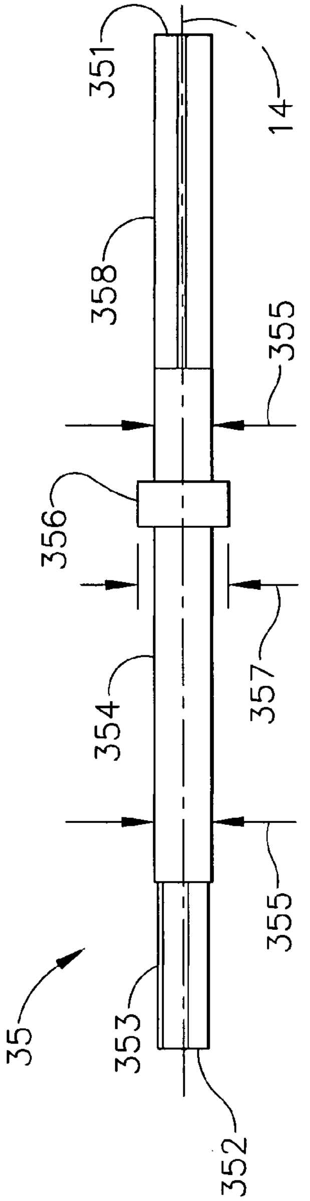

Referring now to FIGS. 4 and 5, an internal assembly 40 of a threaded insert installation tool 10 is illustrated in a first operation mode and in a second operation mode, respectively, according to one embodiment of the present invention. The internal assembly 40 may be part of the adapter assembly 30 (shown in FIG. 3) and may be located under the housing 30. The internal assembly 40 may include a spring 41, a square-hole sleeve 42, and a depth control stop 43. The spring 41 and the sleeve 42 may be positioned on the drive shaft 35. The cross-section of the drive shaft 35 may change from the back end 352 to the front end 351, as shown in FIG. 4*a*. At the back end 352, a first segment 353 of the drive shaft 35 may have a hexagonal cross-section followed by a second segment 354 having a circular cross-section. The second segment 354 may have a first diameter 355. The second segment 354 may include a region 356 having a second diameter 357 that is larger than the first diameter 355. The region 356 may function as a stopper for the spring 41. A third segment 358 of the drive shaft 35 may be positioned at the front end 351 and may have a square cross-section. The third section 358 may receive the square-hole sleeve 42. The third segment 358 having a square cross-section may slide within the square-hole sleeve 42 in longitudinal direction along axis 14. The sleeve 42 extends in longitudinal direction along axis 14 from a front end 421 to a back end 422. The front end 422 may be internally threaded to receive the mandrel 13 of the front-end assembly 11. Consequently, the square-hole sleeve 42 may connect the mandrel 13 with the drive shaft 35. It may further be possible to mount the square-hole sleeve 42 reversed onto the drive shaft 35 to create a stronger design. The depth control stop 43 may be positioned on the mandrel 13 such that it is visible and accessible through the cutout 343 of the housing 34 (shown in FIGS. 1, 2, and 3). The depth control stop 43 may be moved along the mandrel 13 to adjust the installation depth of a threaded insert (not shown). If a torque is applied to the drive shaft 35 with the driver 15, the jam nut 37, the sleeve 42, the mandrel 13, and the depth control stop 43 may all rotate with the drive shaft 35 and at the speed of the drive shaft 35.

A first operation mode, where the mandrel 13 is retracted, is shown in FIG. 4. While the installation tool 10 is in the retracted position, the sleeve 42 may compress the spring 41, as shown in FIG. 4. The depth control stop 43 may be set to the correct installation depth according to the application. A threaded insert (not shown) may be positioned in the cutout 123 of the prewinder 12. The driver 15 may apply torque to the drive shaft 35 and the threaded insert may be pre-wound into a nozzle 17. The installation tool 10 may now be placed over a tapped hole and further application of a torque with the driver 15 will install the threaded insert in the tapped hole until the depth control stop 43 blocks further linear motion of the mandrel 13, as shown in FIG. 5. The spring 41 may assist the conversion of the rotary motion of the drive shaft 35 that is provided by the driver 15 into a linear feed and, therefore, to extend the mandrel 13, as shown in FIG. 5. The rotation of the drive shaft 35 may be reversed to withdraw the mandrel 13, which brings the installation tool 10 back to the retracted position shown in FIG. 4.

Referring now to FIG. 6, an internal assembly 60 of a third modification of a threaded insert installation tool 10 is illustrated according to one embodiment of the present invention. FIG. 6 shows the installation tool 10 in an extended position. The internal assembly 60 may include a drive shaft 35 that includes only the first segment 353, which may be inserted into the get socket 16 of a driver 15, such as battery-operated screwdriver, and the second segment 354. The internal assembly 60 may further include a square-hole sleeve 61 that is in a fixed connection with the second segment 354 of the drive shaft 35; for example, the square-hole sleeve 61 may be threaded onto the drive shaft 35. The mandrel 13 of the front-end assembly 11 may include a segment 62 that may have a square cross-section. The spring 41 may be inserted into the square-hole sleeve 61 followed by the segment 62 of the mandrel 13. The segment 62 of the mandrel 13 may slide within the sleeve 61 in longitudinal direction along axis 14.

Referring now to FIG. 7, a method 70 for installation of a threaded insert in an area with limited access is illustrated according to another embodiment of the present invention.

The method 70 may include, connecting an adapter assembly 30 (shown in FIG. 3) of a threaded insert installation tool 10 that may have a front-end assembly 11 (illustrated in FIGS. 1 and 2) attached to a battery powered screwdriver 15 (illustrated in FIGS. 1 and 2) in step 71. In step 72, the threaded insert installation tool 10 needs to be put in a retracted position (shown in FIG. 4). While in the retracted position, the spring 41 may be compressed (step 721). The depth control stop 43 (FIG. 4) may be set to the correct installation depth in step 73. After positioning a threaded insert (not shown) into the pre-winder 13 of the front-end assembly 11 in step 74, a torque me be applied to the drive shaft 35 of the installation tool 10 with the driver 15, which may be a battery-powered screwdriver, in step 75, to pre-wind the treaded insert. In the following step 76, the installation tool 10 may be placed over a tapped hole that may be located within a barrel and within close proximity to a wall of the barrel and at an extended depth within the barrel. The barrel may be, for example a missile shell. By further applying torque to the drive shaft 35 in step 77, the threaded insert may be installed within the tapped hole. The spring 41 may expand, in step 771, and assist the conversion of the rotary motion of the drive shaft 35 into a linear feed of the front-end assembly 11 (FIG. 5). In step 78, the rotation of the drive shaft may be reversed to retract the mandrel 13 of the installation tool 10 while compressing the spring 41 (FIG. 4).

It should be understood, of course, that the foregoing relates to exemplary embodiments of the invention and that modifications may be made without departing from the spirit and scope of the invention as set forth in the following claims.

We claim:

1. A threaded insert installation tool, comprising:

an adapter assembly, wherein said adapter assembly comprises a drive shaft that extends in longitudinal direction along an axis, and wherein the adapter assembly further comprises a clamping ring that attaches said adapter assembly to a driver with a bit socket, a housing that extends longitudinally along said axis, a bracket that connects said clamping ring with said housing, and an internal assembly that is covered by said housing; and a front-end assembly, wherein said front-end assembly comprises a mandrel that extends in longitudinal direction along said axis, said front-end assembly is in a rigid connection with said drive shaft, wherein said front-end assembly is at least partially covered by said housing, wherein said front end assembly is rotatably received inside of said housing in the longitudinal direction along said axis, and wherein said front end assembly has a portion which translates only along the longitudinal direction.

2. The threaded insert installation tool of claim 1, wherein said drive shaft extends from a back end to a front end, wherein said drive shaft includes a first segment having a hexagonal cross-section at said back end, a second segment having a circular cross-section having a first diameter, and a third segment having a square cross-section at said front end, wherein said second segment includes a region having a second diameter that is larger than said first diameter.

3. The threaded insert installation tool of claim 2, wherein said back end of said drive shaft is inserted into said bit socket, and wherein said drive shaft is driven by said driver.

4. The threaded insert installation tool of claim 3, wherein said driver is a battery-operated screwdriver.

5. The threaded insert installation tool of claim 3, wherein the internal assembly further comprises a depth control stop, wherein the depth control stop rotates with the mandrel when driven by the driver.

6. The threaded insert installation tool of claim 5, wherein said internal assembly includes a square-hole sleeve that is positioned on said third segment of said drive shaft having a square cross-section, a spring that is positioned on said second segment of said drive shaft having a circular cross-section between said region with said second diameter and said square-hole sleeve.

7. The threaded insert installation tool of claim 6, wherein said square-hole sleeve connects said mandrel of said front-end assembly with said drive shaft of said adapter assembly.

8. The threaded insert installation tool of claim 6, wherein said spring is compressed when said mandrel is retracted, and wherein said spring expands when said mandrel is extended.

9. The threaded insert installation tool of claim 6, wherein the square-hole sleeve rotates when driven by the driver.

10. The threaded insert installation tool of claim 5, wherein said housing includes a cutout, and wherein said depth control stop is accessible through said cutout.

11. The threaded insert installation tool of claim 5, wherein said clamping ring and said bracket include a split top, wherein said bracket includes a clamping screw, and wherein said clamping screw tightens or loosens said clamping ring.

12. The threaded insert installation tool of claim 11, wherein the clamping screw is a knurled head screw.

13. The threaded insert installation tool of claim 5, wherein the depth control stop is connected to the mandrel.

14. The threaded insert installation tool of claim 5, wherein the depth control stop is movable on the mandrel along the axis.

15. The threaded insert installation tool of claim 1, wherein said front-end assembly further includes a prewinder that houses said mandrel and that is in a rigid connection with said housing of said adapter assembly.

16. The threaded insert installation tool of claim 15, wherein the prewinder is a round barrel shape.

17. The threaded insert installation tool of claim 15, wherein the prewinder is an octagonal barrel shape.

18. The threaded insert installation tool of claim 15, further comprising:

a nozzle, wherein the nozzle is in rigid connection with the prewinder, and wherein the nozzle is configured to receive a threaded insert.

19. The threaded insert installation tool of claim 1, further comprising:

a housing collar, wherein the housing collar receives the housing and is in a fixed connection with the bracket, and wherein the housing collar extends in the longitudinal direction along the axis.

20. The threaded insert installation tool of claim 19, wherein the housing collar has an end that is threaded, and further comprising:

a jam nut, wherein the jam nut secures the housing collar to the bracket by threading onto the end.

* * * * *